Feb. 18, 1936. W. C. BLACKMOND 2,030,847
MIXING MACHINE
Filed Jan. 14, 1935    2 Sheets-Sheet 1

Inventor
William C. Blackmond
By Jack A. Ashley
Attorney

Feb. 18, 1936.  W. C. BLACKMOND  2,030,847

MIXING MACHINE

Filed Jan. 14, 1935   2 Sheets-Sheet 2

Inventor
William C. Blackmond
By Jack A. Seley
Attorney

Patented Feb. 18, 1936

2,030,847

UNITED STATES PATENT OFFICE 2,030,847

MIXING MACHINE

William C. Blackmond, Ranger, Tex., assignor of one-half to Joseph H. Reynolds, Cisco, Tex.

Application January 14, 1935, Serial No. 1,656

6 Claims. (Cl. 259—38)

This invention relates to new and useful improvements in mixing machines.

One object of the invention is to provide an improved mixing machine, particularly adapted to mix finely comminuted materials.

An important object of the invention is to provide a mixing machine provided with a hopper having false sides, arranged to be kept in motion during the operation of the machine so as to prevent packing and arching or bridging of the finely comminuted dry material contained in said hopper, and whereby said dry material is adequately delivered to a screw conveyor at the bottom of the hopper, thus assuring a proper mixture.

A further object of the invention is to provide means for revolving the screw conveyor in timed relation to the swinging of the false sides, whereby the dry material is properly fed to said conveyor.

A construction designed to carry out the invention will be hereinafter described, together with other features of the invention.

Figure 1:
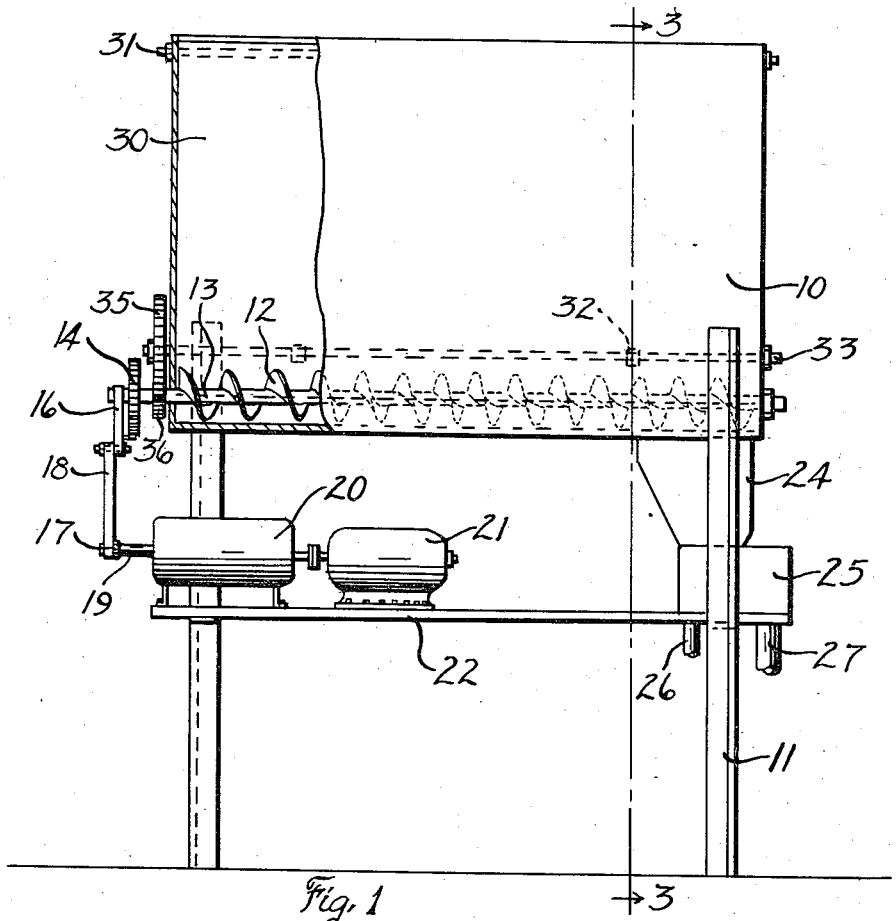
Figure 4:
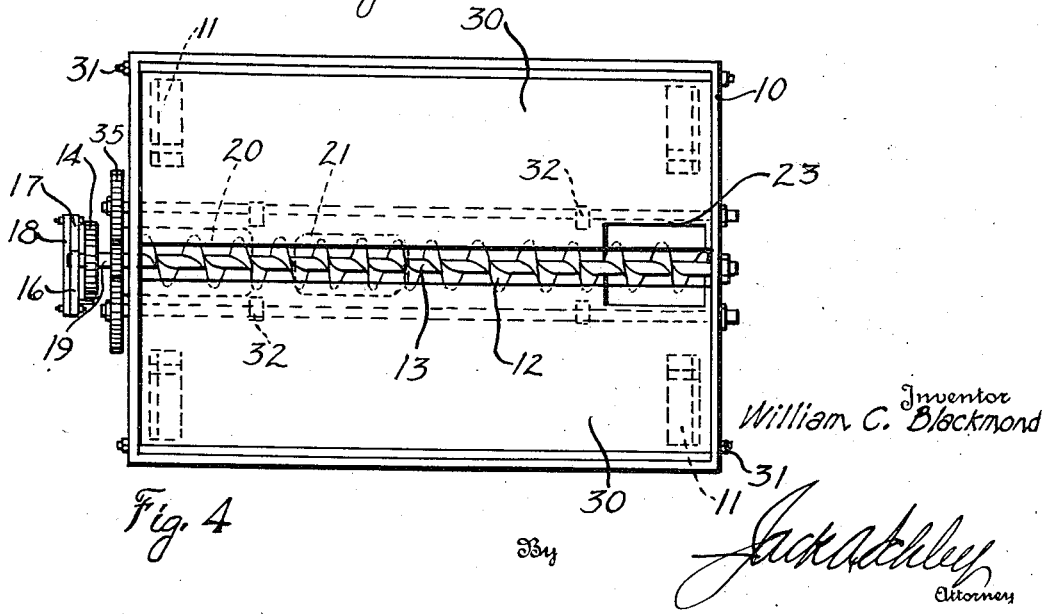
Figure 2:
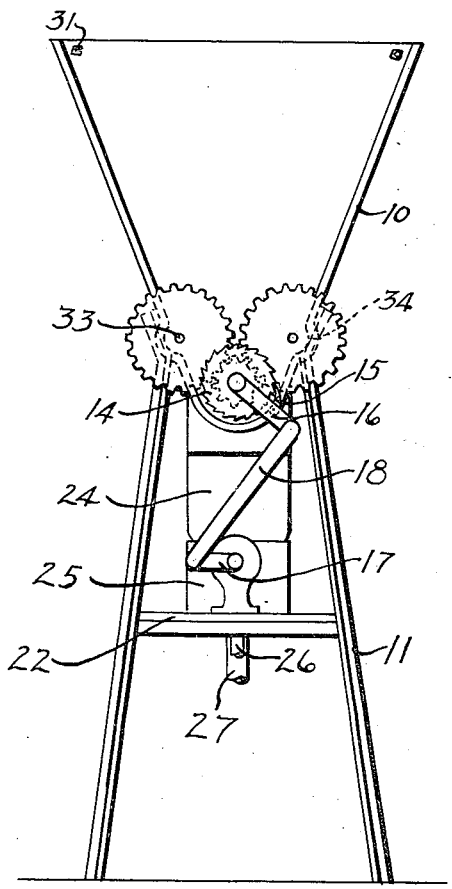
Figure 3:
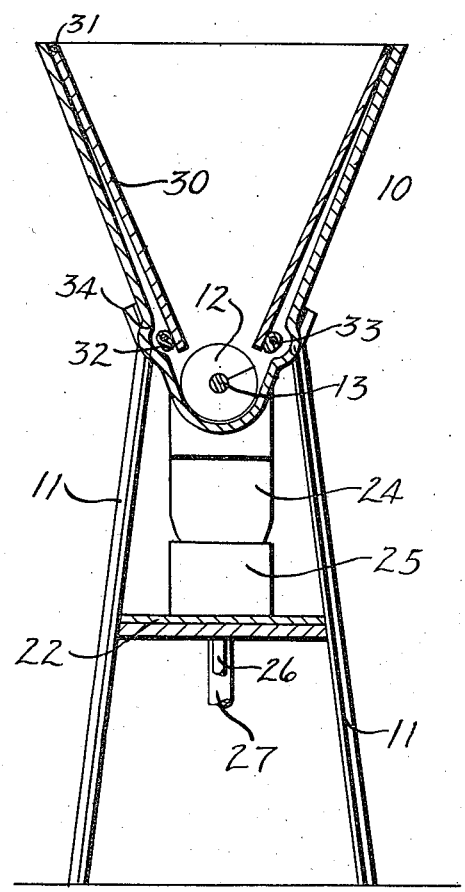
Figure 5:
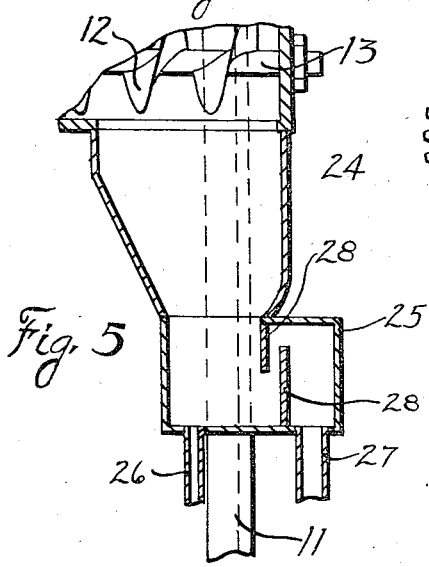
Figure 6:
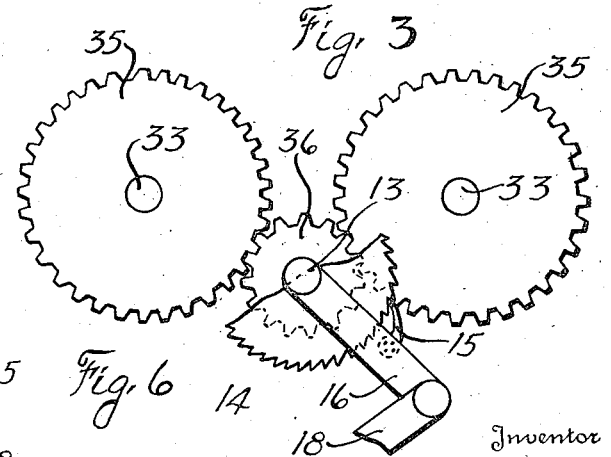

The invention will be more readily understood from a reading of the following specification and by reference to the accompanying drawings, in which an example of the invention is shown, and wherein:

Figure 1 is a view partly in elevation and partly in section, of a mixing machine constructed in accordance with the invention, Figure 2 is an end elevation of the same, Figure 3 is a transverse vertical sectional view, taken on the line 3—3 of Figure 1, Figure 4 is a plan view, Figure 5 is a vertical sectional view of the mixing chamber, and Figure 6 is an enlarged detail of the operating gears.

In the drawings, the numeral 10 designates a flared hopper having a rounded bottom. The hopper is suitably supported on standards, or legs 11 which are preferably constructed of angle bars and are of a substantial height whereby the hopper is supported some distance above floor. It is pointed out that the size of said legs and the material of which they are constructed is subject to variation.

A longitudinal, screw conveyor 12 is mounted in the rounded bottom of the hopper and extends the entire length thereof. One end of the conveyor shaft 13 is journaled in one end wall of the hopper, while the other end of said shaft extends through the opposite end wall and carries a ratchet gear 14 at its outer end. The gear 14 is arranged to be engaged by a pawl 15 which is carried by an arm 16 pivoted on the end of the shaft 13, whereby when the arm is swung, rotation is imparted to the ratchet gear 14 by the engagement of the pawl with the teeth of said gear.

For swinging the arm 16, the outer end of said arm is connected with a crank 17 by a link 18. The crank is fastened on a shaft 19 extending outwardly from a reduction gearing case 20. The shaft 19 is driven through the reduction gearing by an electric motor 21, or other source of power. The gearing case 20 and motor are mounted on a longitudinally extending transverse support 22 which is secured to the legs 11 of the device. It is obvious that the rotation of the crank will swing the arm 16 to cause the pawl 15 to engage the ratchet gear, thereby rotating the screw conveyor. The conveyor is disposed within the bottom so that it will carry the material entered into the hopper toward the end opposite that on which the gears are mounted. At this end an opening 23 is formed in the bottom of the hopper, whereby the material may escape from said hopper.

A depending chute 24 surrounds the opening 23 and has its lower reduced end connected with a mixing chamber 25, whereby material from the hopper is conducted to said chamber. The chamber is mounted on one end of the longitudinal support 22 and has a water inlet pipe 26 connected in its bottom at one side thereof (Figure 5). Its opposite side has an outlet pipe 27 connected in the bottom and it will be seen that the material introduced from the hopper 10 is mixed with the water, within the chamber, the mixture escaping through the outlet pipe 27. To retard the material in the chamber and thereby assure a thorough mixing thereof with the water transverse baffles 28 are disposed within the mixing chamber.

In actual practice, it has been found that in employing the screw conveyor 12 in mixing and carrying comminuted materials, the tendency of said materials, due to their fineness, is to pack and arch or bridge over said conveyor. This not only interferes with the efficiency of the conveyor but also causes an uneven feeding of the materials to the mixing chamber 25. To overcome these disadvantages, the hopper is provided with false sides 30 which extend upwardly and are inclined outwardly, lying contiguous to the sides of the hopper 10.

Each side is pivoted at its upper end on a longitudinal shaft 31, whereby the lower end is free to swing inwardly within the hopper. The lower ends of said sides terminate short of the conveyor so that in swinging they will clear the top of the same. For swinging the lower ends of the sides inwardly when the conveyor 12 is rotating, a pair of cams is fastened on a longitudinally extending shaft 33 for each side and the cams are mounted to rotate in a recess 34 formed in the side wall of the hopper. By observing Figure 3, it will be seen that the rotation of the cams will swing the lower end of the sides inwardly. Due to the length of each side and its pivot at the upper end, said side will swing outwardly by its own weight when the actuating portion of each cam rotates into the recess. Therefore, when the cams are rotated, the lower ends of false sides are swung back and forth constantly, whereby the materials in the hopper are thoroughly agitated and packing and bridging of said materials is prevented. The constant agitation of said materials also makes for more efficient operation of the conveyor and an even and smooth feed of said materials to the chute and chamber 25.

It is desirable to operate the conveyor in timed relation to the swinging sides so that the dry material is properly fed to the conveyor. To accomplish this result, one end of each cam shaft 33 extends outwardly through the end of the hopper adjacent to and above the outwardly extending end of the conveyor shaft 13. This end of each cam shaft is provided with an enlarged gear 35, and these gears are in constant engagement with a pinion 36 which is secured on the conveyor shaft adjacent the inner side of the ratchet gear 14. With this arrangement, when the ratchet gear and conveyor shaft 13 is rotated as has been explained, the cam shafts 33 are rotated through the pinion 36 and gears 35, whereby the false sides are swung. It is pointed out that the sides are operated when the conveyor is rotating, which assures an agitation of the dry material to provide proper feeding of said material from the hopper. The sides may be swung at any desired speed with relation to the speed of the conveyor, for it is clear that the size of the gears 35 and pinion 36 control this ratio, which may be readily varied by changing the size of said gears and pinion. The constant agitation brought about by the swinging sides increases the capacity, as well as, the efficiency of the mixer.

What I claim and desire to secure by Letters Patent is:

1. A mixer comprising, a hopper, a screw conveyor at the bottom of the hopper, false sides in the hopper extending along each side of said conveyor, a longitudinal shaft mounted behind each swinging side, cams secured on each shaft and arranged to engage the rear sides of the false sides to swing the same over said conveyor, and means for revolving said shafts.

2. A mixer comprising, a hopper, a screw conveyor at the bottom of the hopper, false sides in the hopper extending along each side of and above said conveyor, a longitudinal shaft mounted behind each swinging side, cams secured on each shaft and arranged to engage the sides to swing the same transversely of said conveyor, a rotatable gear carried by the outer end of each cam shaft, and a pinion on the conveyor shaft in constant engagement with both of the gears, whereby rotation of the conveyor will actuate the cams to swing the sides.

3. A mixer comprising, a hopper, a screw conveyor at the bottom of the hopper, false sides in the hopper extending along each side of and above said conveyor, a longitudinal shaft mounted behind each swinging side, cams secured on each shaft and arranged to engage the sides to swing the same transversely of said conveyor, a rotatable gear carried by the outer end of each cam shaft, a pinion on the conveyor shaft in constant engagement with both of the gears, whereby rotation of the conveyor will actuate the cams to swing the sides, a ratchet gearing on the outer end of the conveyor shaft for intermittently rotating said shaft, and means for imparting motion to said gearing.

4. A mixer comprising, a hopper, a screw conveyor at the bottom of the hopper, false sides in the hopper extending along each side of said conveyor, and means for simultaneously swinging said false sides toward and away from each other to prevent dry comminuted material arching over said conveyor.

5. A mixer comprising, a hopper, a screw conveyor at the bottom of the hopper, false sides in the hopper extending along each side of said conveyor, means for simultaneously swinging the false sides toward and away from each other, and means for revolving said conveyor in timed relation to the movement of said sides to prevent dry comminuted material arching over said conveyor and to discharge said material from the hopper in a uniform stream.

6. A mixer comprising, a hopper, a screw conveyor at the bottom of the hopper, false sides in the hopper extending upwardly and inclined outwardly at their upper ends and positioned along each side of the conveyor, and means for simultaneously swinging said false sides toward and away from each other to prevent dry comminuted material from arching over said conveyor.

WILLIAM C. BLACKMOND.